(12) United States Patent
Nakano

(10) Patent No.: US 7,438,439 B2
(45) Date of Patent: Oct. 21, 2008

(54) TEMPERATURE ADJUSTING DEVICE FOR AN LED LIGHT SOURCE

(75) Inventor: Shoichi Nakano, Wakayama (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 245 days.

(21) Appl. No.: 11/533,269

(22) Filed: Sep. 19, 2006

(65) Prior Publication Data

US 2007/0121324 A1 May 31, 2007

Related U.S. Application Data

(63) Continuation-in-part of application No. 10/776,158, filed on Feb. 11, 2004, now abandoned.

(30) Foreign Application Priority Data

Feb. 13, 2003 (JP) ............................... 2003-35400

(51) Int. Cl.
*F21V 33/00* (2006.01)
*F21V 23/04* (2006.01)
(52) U.S. Cl. .................... 362/276; 362/85; 362/294
(58) Field of Classification Search ................ 362/294, 362/85, 92, 800, 276, 580; 358/475, 482, 358/484, 514
See application file for complete search history.

(56) References Cited

U.S. PATENT DOCUMENTS 6,960,759 B2    11/2005   Konagaya
7,224,500 B2 *  5/2007    Konagaya ................... 358/475
2002/0079746 A1 6/2002    Hashimoto
2002/0122216 A1 9/2002    Konagaya

FOREIGN PATENT DOCUMENTS

| JP | 04005624 | 1/1992 |
|----|----------|--------|
| JP | 8-69054 | 3/1996 |
| JP | 8-234848 | 9/1996 |
| JP | 2000-127493 A | 5/2000 |
| JP | 2002-190686 | 7/2002 |
| JP | 2002-281240 A | 9/2002 |
| JP | 2002-330266 | 11/2002 |
| JP | 2002-365735 | 12/2002 |
| WO | WO 92/22863 | 12/1992 |

* cited by examiner

*Primary Examiner*—Bao Q Truong
(74) *Attorney, Agent, or Firm*—Knobbe Martens Olson & Bear LLP

(57) ABSTRACT

A temperature adjusting device of the present invention is provided with: an LED light source 11r, 11g and 11b, a temperature sensor 9 for detecting an ambient temperature of the LED light source 11r, 11g and 11b, a cooling fan for cooling the LED light source 11r, 11g and 11b, a driving circuit 22 for driving the cooling fan 20, a control unit 4 that controls a voltage to be applied to the cooling fan 20 so as to set the ambient temperature within a predetermined range based upon the results of detection by the temperature sensor 9 and a heater placed near the LED light source 11r, 11g and 11b, and in this arrangement, the control unit is designed to control the applied voltage to the heater so as to reduce the heating value of the heater in cooperation with lighting of the LED light source 11r, 11g and 11b.

8 Claims, 4 Drawing Sheets

TEMPERATURE ADJUSTING DEVICE FOR AN LED LIGHT SOURCE

CROSS-REFERENCE TO RELATED APPLICATIONS

This is a continuation-in-part of U.S. patent application Ser. No. 10/776,158, filed Feb. 11, 2004, now abandoned which claims priority to Japanese Patent Application No. 2003-35400, filed Feb. 13, 2003, and the disclosure of which is incorporated herein by reference in its entirety.

BACKGROUND OF THE INVENTION

1. Field of the Invention

This invention relates to a temperature adjusting device for an LED light source that is provided with an LED light source, a temperature sensor for detecting an ambient temperature of the LED light source, a cooling fan for cooling the LED light source, a driving circuit for driving the cooling fan, and a control unit which controls a voltage to be applied to the cooling fan so as to set the ambient temperature within a predetermined range based upon the results of detection by the temperature sensor.

2. Description of the Related Art

With respect to a light source used in a copying machine, an image-reading apparatus and the like, after turning the light source on, a temperature rise tends to occur due to self heat generation to cause changes in the light source characteristics and the resulting adverse effects in image quality of a read image. For this reason, a device which carries out temperature adjustments so as to adjust the ambient temperature (environmental temperature) of the light source within a predetermined temperature range by using a heater and a cooling fun has been proposed. For example, JP-A No. 2-267541 has been known as such a device using a fluorescent lamp as the light source.

Further, in a photographic processing device for forming photographic prints, a scanner for reading frame images formed in a developed negative film has been used. With respect to a reading light source for use in this scanner, a halogen lamp has been generally used. Here, those light sources using an LED light source have also been known from the viewpoints of its long life and elimination of the need for exchanging the light sources. For example, JP-A No. 2002-365735 has disclosed such a photographic film reading device.

In the case when an LED light-source is used, the LED is subjected to changes in characteristics in the light amount and wavelength depending on temperatures and the subsequent changes in the reading performance; therefore, it is necessary to carry out temperature adjustments. In order to carry out the temperature adjustments, a temperature sensor for detecting the environmental temperature at which the LED light source is placed is installed, and when the preset temperature range is exceeded, a cooling fan is turned on so as to lower the temperature. When the temperature is cooled to a preset temperature, the cooling fan is turned off.

However, the control method for on/off controlling the above-mentioned cooling fan has the following problems. Since, upon turning the cooling fan on, the LED is quickly cooled, the characteristics of the LED tend to deviate. LED light sources of three colors are required in order to read an image of a color photographic film; however, when there are deviations in the characteristics, adverse effects are caused on the reading performances. Moreover, when the cooling fan is quickly turned on and off, changes in noise are offensive to the ear, and make the workers uncomfortable.

When a halogen lamp is used as the light source, a cooling fan is also used; however, since the halogen lamp is less susceptible to changes in characteristics due to the ambient temperature, the cooling fan can be continuously rotated without the necessity of turning on and off. When the cooling fan is continuously rotated, the noise from the fan is not offensive to the ear. In the case of the LED light source, however, since the characteristics thereof are changed depending on the ambient temperature, it is not possible to keep the cooling fan rotating all the time.

The present invention has been devised so as to solve the above-mentioned problems, and its objective is to provide a temperature adjusting device for an LED light source which, upon temperature-adjusting the LED light source by using a cooling fan, neither causes unnecessary deviations in characteristics in the LED, nor makes the workers uncomfortable due to abrupt changes in noise.

SUMMARY OF THE INVENTION

In order to solve the above-mentioned problems, a temperature adjusting device for an LED light source in accordance with the present invention is provided with: an LED light source, a temperature sensor for detecting an ambient temperature of the LED light source, a cooling fan for cooling the LED light source, a driving circuit for driving the cooling fan, a control unit that controls a voltage to be applied to the cooling fan so as to set the ambient temperature within a predetermined range based upon the results of detection by the temperature sensor and a heater placed near the LED light source, and in this arrangement, the control unit is designed to control the applied voltage to the heater so as to reduce the heating value of the heater in cooperation with lighting of the LED light source.

In accordance with this arrangement, the control unit controls the applied voltage to the cooling fan. Moreover, it controls the applied voltage to the heater so as to reduce the heating value of the heater in cooperation with lighting of the LED light source. Consequently, the temperature adjustment of the LED light source can be carried out appropriately. In other words, the heater is installed near the LED light source so as to set the ambient temperature of the LED light source higher than room temperature. Furthermore, prior to the use of the LED light source, a desired ambient temperature is prepared by the heating process of the heater, and since, when the LED light source is turned on, the ambient temperature rises, the heater is controlled so as to reduce the heating value. For example, when the quantity of light of the LED light source is controlled step by step, the degree of rise of the ambient temperature differs accordingly. In this case, the heating value of the heater is preferably reduced in accordance with the quantity of light (or quantity of heat generation) of the LED light source.

Here, in one embodiment of the present invention, when the ambient temperature is higher than a predetermined temperature, the control unit may turn off the applied voltage to the heater. With this arrangement, before the ambient temperature has exceeded a predetermined temperature to impair characteristics of the LED light source, the applied voltage to the heater can be turned off so that the temperature adjustment of the LED light source can be carried out appropriately.

Moreover, in another embodiment of the present invention, the control unit may control the applied voltage to the heater so as to reduce the heating value of the heater step by step. With this arrangement, the applied voltage to the heater can be controlled in accordance with the degree of rise of the ambient temperature so that the heating value of the heater is reduced step by step.

In still another embodiment of the present invention, upon turning on/off a voltage to be applied to the cooling fan, the control unit may raise/lower the applied voltage gradually.

In this arrangement, the control unit which on/off controls the voltage to be applied to the cooling fan is installed. Moreover, upon turning the voltage to be applied on from the off-state, the voltage is not applied abruptly as a target voltage, but applied as a gradually increasing voltage toward the target voltage. With this arrangement, the number of revolutions of the cooling fan is gradually increased so that the LED is not cooled abruptly. Moreover, noise, generated by the cooling fan, gradually increases so that it is possible to avoid making the workers uncomfortable. In the same manner, upon turning the voltage to be applied off from the on-state, the applied voltage is gradually lowered. As a result, it is possible to provide a temperature adjusting device for an LED light source which neither causes unnecessary deviations in characteristics in the LED, nor makes the workers uncomfortable due to abrupt changes in noise.

With respect to a preferred embodiment of the present invention, the above-mentioned LED light source is preferably used as a scanner-use light source used for reading frame images of a photographic film.

In particular, in the case when a color photographic film is read, LED light sources of three colors are required; therefore, when there are deviations in characteristics of the respective LEDs, adverse effects might be given to image quality of a read image. In other words, in the case when an LED light-source is used as a scanner-use light source used for reading a photographic film, the arrangement of the present invention particularly exerts superior effects.

In another preferred embodiment of the present invention, the above-mentioned LED light source is formed into a line shape along the width direction of a photographic film that is to be read, and a line-shaped heater to be placed in parallel with the line direction of the LED light source is prepared, and in this arrangement, the control unit turns the above-mentioned heater off in synchronism with the turning-on of the LED light source, while it on/off controls the above-mentioned cooling fan irrespective of the turning on/off of the heater.

In order to appropriately carry out temperature adjustments of the LED light source, the temperature control is preferably carried out to an environmental temperature slightly higher than the temperature of a room in which the scanner is placed. In other words, in the case when the environmental temperature is set to a temperature lower than the room temperature, since the temperature is always influenced by the room temperature, the blower fan needs to be continuously set to the on-state. Here, in such a cooling method, the environmental temperature inside the LED unit is susceptible to irregularities. As a result, it is not possible to stabilize the light emission of the LED so that this method is not suitable for the formation of a photographic image that needs to be dealt as high image-quality data. With respect to the supply ends of the photographic processing devices, there are warm areas and cold areas, and when all those supply ends are taken into consideration, the environmental temperature of the LED needs to be set to, for example, a temperature slightly higher than the temperature (or recommended environmental temperature of the machine) of a warm area.

In this case, when the reading operation for a photographic film is started, it is preferable to preliminarily set the temperature to a desired environmental temperature. Therefore, the line-shaped heater is placed adjacent to the line-shaped LED light source, and prior to the application of the LED light source, the heater is used to heat the LED light source to be set to the desired environmental temperature. When the LED light source is actually turned on, the heater is turned off. After turning the LED light source on, since the LED itself generates heat, it is not necessary to turn the heater on. In other words, when the LED light source is off, heat is generated by the heater, and when the LED light source is on, heat is generated by the LED light source itself. Therefore, irrespective of the turning on/off of the heater, the setting of the environmental temperature is carried out with high precision by on/off controlling the cooling fan.

DETAILED DESCRIPTION OF THE PREFERRED EMBODIMENTS

Figure 1:
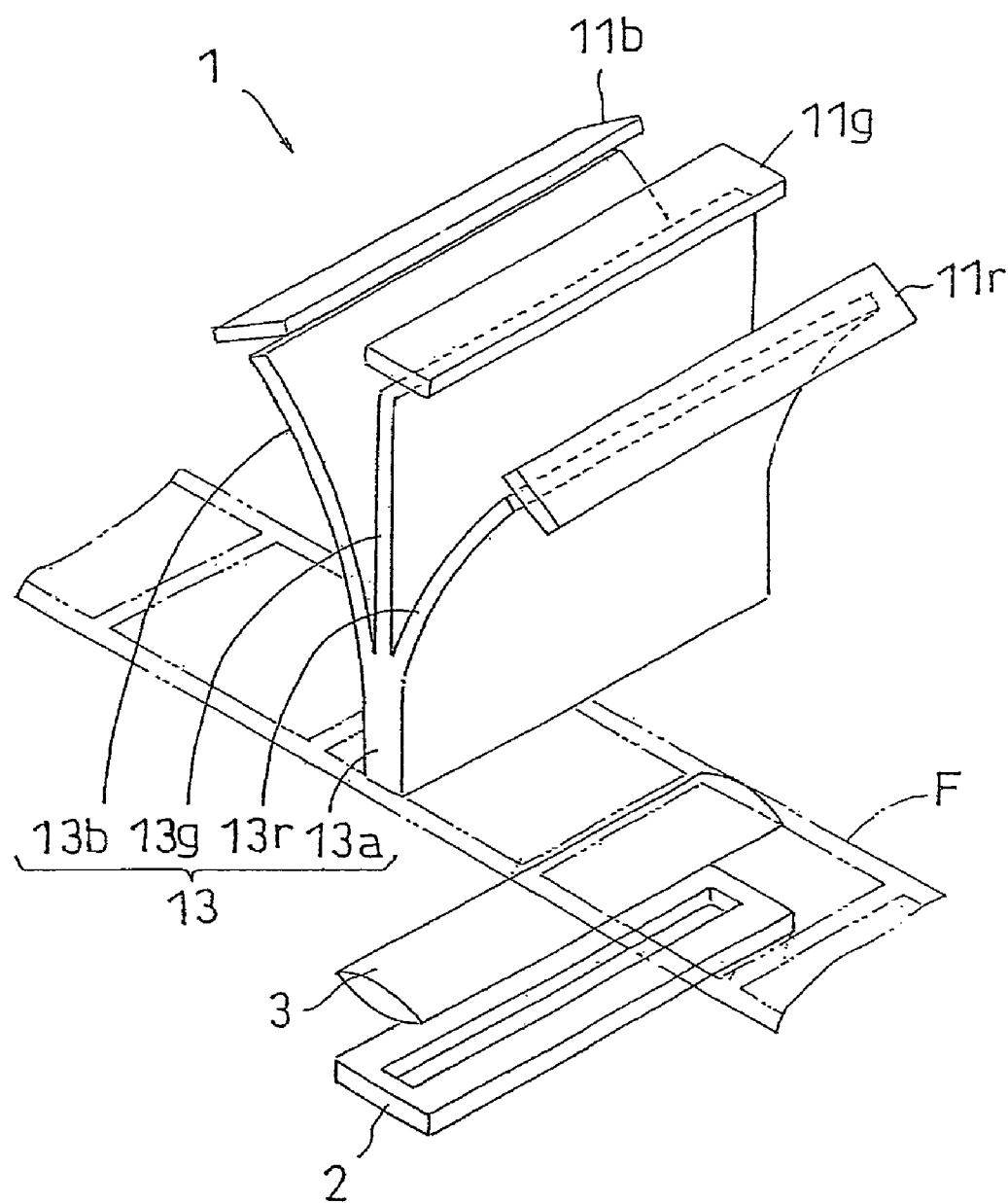
FIG. 1 is a perspective view that shows a structure of a scanner device in which an LED light source is used.
Figure 2:
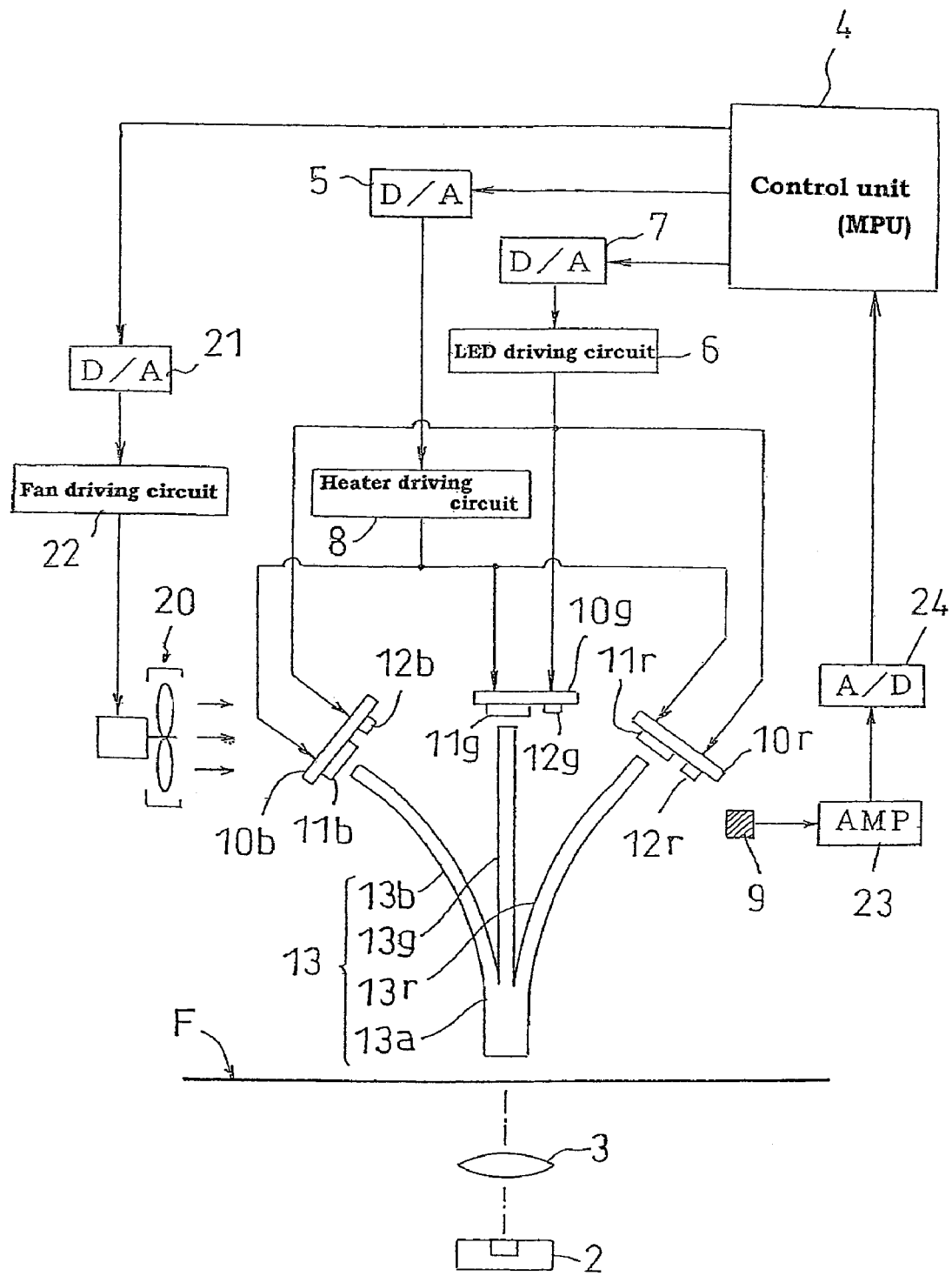
FIG. 2 is a block diagram that explains a temperature adjusting device of the LED light source and functions thereof.

Referring to Figures, the following description will discuss preferred embodiments of a temperature adjusting device for an LED light source in accordance with the present invention. FIG. 1 is a perspective view that shows a structure of a scanner device in which an LED light source is used. FIG. 2 is a block diagram that explains a temperature adjusting device of the LED light source and functions thereof.

<Structure of Scanner Device>

This scanner device 1 is used for reading frame images formed on a photographic film F, such as a negative-working film and a positive-working film, to form electronic data. With a transporting face on which a photographic film F is transported being sandwiched in between, LED light sources 11r, 11g and 11b serving as reading light sources are placed on one side, and a CCD line sensor 2 serving as a reading sensor is placed on the other side. The red LED light source 11r, the green LED light source 11g and the blue LED light source 11b are installed in order to acquire color image data from the color photographic film. The respective LED light sources are formed in a line shape in association with the line-shaped CCD line sensor 2.

In comparison with a case in which a halogen lamp is used as the light source, the LED light source has a longer service life, and also has the advantage that hardly any exchanging operations are required. Moreover, the halogen lamp requires a light-adjusting filter, while the LED light source requires no light-adjusting filter. This is because, for example, in order to deal with differences in color in the base of the negative working film, it is only necessary to adjust the output of each of the LED light sources. Therefore, it is possible to simplify the structure of the scanner device.

An optical fiber 13 for guiding light rays applied from the respective LED light sources 11r, 11g and 11b is installed. The optical fiber 13 includes a red LED-use guide portion 13r, a green LED-use guide portion 13g and a blue LED-use guide portion 13b, and these portions are joined into a joining portion 13a, and outputted to the photographic film F in a mixed color state. The light rays, applied from the optical fiber 13, are allowed to pass through the photographic film F, and made incident on the CCD line sensor 2 through a converging lens 3. By transporting the photographic film F at a constant speed, image data corresponding to the frame images formed on the photographic film are successively acquired.

As shown in FIG. 2, the respective LED light sources 11r, 11g and 11b are attached to LED substrates 10r, 10g and 10b. Moreover, heaters 12r, 12g and 12b are placed adjacent to (in parallel with) the line-shaped LED light sources 11r, 11g and 11b. These heaters 12r, 12g and 12b are required so as to control the ambient temperature at which the LED light-sources 11r, 11g and 11b are placed to a predetermined range. As the ambient temperature changes, the LED light sources 11r, 11g and 11b also change in characteristics thereof, such as light quantity and wavelength. Consequently, the quality of read images deteriorates. Therefore, in the case when the LED light sources 11r, 11g and 11b are used as scanner-use light sources, it is necessary to carry out temperature adjustments.

A control unit 4 (MPU) that controls the temperature-adjusting device is installed. The control unit 4 carries out controlling operations on respective units in accordance with set programs. Light-quantity data, required for driving the LED light-sources 11r, 11g and 11b, are sent to a D/A conversion unit 7 from the control unit 4 so that the respective LED light sources 11r, 11g and 11b are driven through an LED driving circuit 6. The LED light sources 11r, 11g and 11b are driven and controlled by current-controlling operations.

Moreover, data, required for driving the heaters 12r, 12g and 12b, are sent to a D/A conversion unit 5 so that the respective heaters 12r, 12g and 12b are driven through a heater driving circuit 8. The respective LED light sources 11r, 11g and 11b and the respective heaters 12r, 12g and 12b are installed on substrates 10r, 10g and 10b.

Furthermore, a cooling fan 20 for adjusting the ambient temperature is installed. The ambient temperature is always monitored by a temperature sensor 9, and when the ambient temperature is out of a predetermined range, the cooling fan 20 is on/off controlled. The cooling fan 20 is turned on (activated) by applying a predetermined voltage thereto. Voltage data are sent to a D/A conversion unit 21 from the control unit 4 so that the cooling fan 20 is driven and controlled based upon a voltage applied thereto from a fan driving circuit 22. A signal from the temperature sensor 9 for measuring the ambient temperature is amplified in an amplifier 23. This signal is converted by an A/D conversion unit 24, and sent to the control unit 4. Based upon these temperature data, the control unit 4 on/off controls the cooling fan 20.

<Temperature Adjustments>

Figure 3:
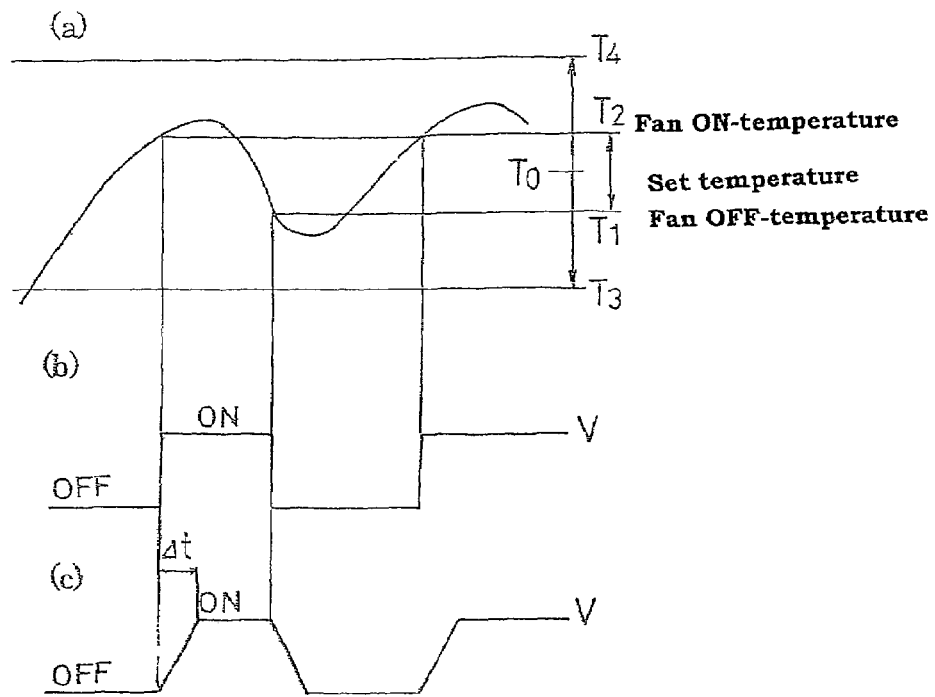
FIG. 3 is a graph that explains the contents of the temperature adjusting process.

The following description will discuss a specific method for adjusting the temperature by the use of a temperature adjusting device as shown in FIG. 2. FIG. 3 shows a graph that explains the contents of the temperature adjustments, and the axis of abscissas indicates the elapsed time and the axis of ordinates indicates the ambient temperature detected by the temperature sensor 9. $T_D$ represents a set temperature. $T_3$ represents a lower limit temperature of a permissible range. $T_4$ represents an upper limit temperature in the permissible range. Here, $T_1$ represents a temperature at which the cooling fan 20 is switched off. $T_2$ represents a temperature at which the cooling fan 20 is switched on.

FIG. 3(b) shows a graph that explains a conventional on/off controlling method. When the ambient temperature exceeds the upper-side switching temperature $T_2$, a voltage V is abruptly applied to allow the cooling fan 20 to start rotating abruptly. After the cooling fan 20 has been driven, the ambient temperature is gradually lowered, and when the ambient temperature goes lower than the lower-side switching temperature $T_1$, the cooling fan 20 is switched off so that the applied voltage suddenly drops from V to 0. Consequently, the operation of the cooling fan 20 is suddenly stopped. However, such abrupt on/off operations for the applied voltage cause abrupt changes in noise, making the workers uncomfortable due to offensive noise to the ear. Moreover, when the LEDs are abruptly cooled, greater adverse effects due to changes in the characteristics are caused.

For this reason, controlling operations as shown in FIG. 3(c) are carried out. In other words, when the ambient temperature exceeds $T_2$, the applied voltage to the cooling fan 20 is gradually increased. The time period is represented by $\Delta t$. The time period is preferably set to 1 to 2 seconds. This is because the time period of less than 1 second fails to eliminate offensive noise, while the time period exceeding 2 seconds causes degradation in temperature-controlling precision. Moreover, in the case when the ambient temperature goes below $T_1$, the applied voltage is gradually lowered in the time period of $\Delta t$. Thus, the changes in noise are smoothed so that offensive noise to the ear is eliminated. Moreover, since the LED light source is not cooled abruptly, it is possible to reduce changes in the characteristics of the LED.

<Time Chart>

Figure 4:
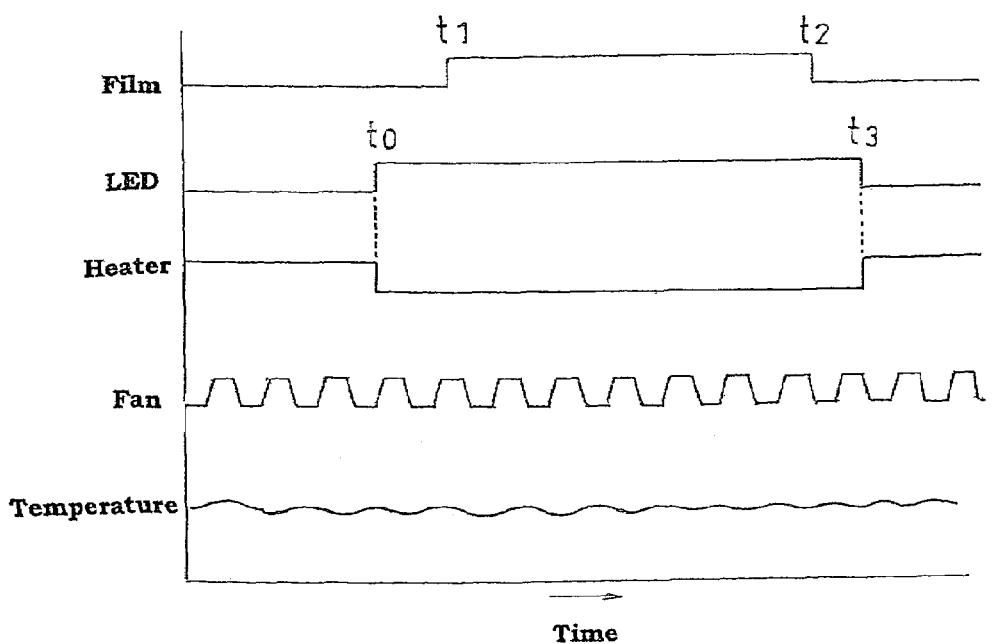
FIG. 4 is a time chart in the case when the scanner is used.

Next, referring to FIG. 4, the following description will discuss a time chart that is used when frame images in a photographic film are read by using the scanner 1. In FIG. 4, a photographic film is set in the scanner 1 so that timing $t_1$ in which the film is transported is indicated. The completion of the transporting process is indicated by $t_2$. The LED light source is turned on at to prior to the start of the transporting process of the photographic film, and is turned off at $t_3$ after the completion of the transporting process. Moreover, the heater is turned off in synchronism with the turning-on of the LED light source (although not shown in FIG. 4, the on/off control of the heater has been started upon carrying out a warming-up process of the photographic processing apparatus). The ambient temperature in which the LED is used needs to be always set in a predetermined range ($T_3$ to $T_4$). This temperature range is set to, for example, not less than 40° C. This temperature is slightly higher than the ambient temperature at which the scanner device is installed. Therefore, in order to maintain the ambient temperature of the LED light source at a predetermined level, even when the scanning process of the photographic film is not carried out, the heater is maintained in the on-state during the corresponding time. Since, during the on-state of the LED light source, the LED itself generates heat, it is not necessary to turn the heater on, and the heater is maintained in the off-state.

For the reason, as described above, the cooling fan 20 is also controlled so as to be always operable. In other words, as shown in FIG. 4, irrespective of the on/off operation of the heater, operation controls are carried out on the cooling fan. Thus, the ambient temperature at which the LED light sources are placed is always maintained appropriately.

<Embodiment of Heater Control>

Figure 5:
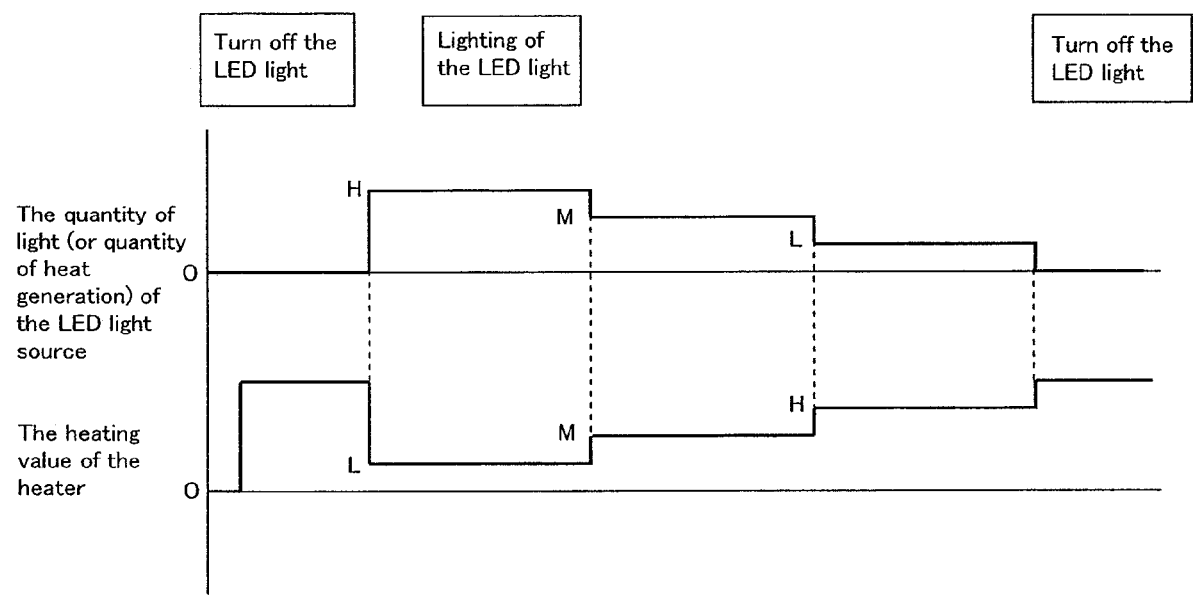
FIG. 5 is a drawing that explains the contents of heater controlling operations.

Next, referring to FIG. 5, the following description will discuss control of a voltage to be applied to a heater. Referring to FIG. 4, it has been explained that on/off controlling operations are conducted with respect to the control of a voltage to be applied to a heater, and the following description will discuss controlling operations in which the applied voltage to the heater is controlled in accordance with the quantity of light of the LED light source so as to maintain the ambient temperature within a predetermined range. In the case when an LED light source is used as a light source for use in reading a photographic film, the quantity of light sometimes needs to be changed in accordance with the kind of the photographic film (for example, positive-working film and negative-working film). In this case, as has been described earlier, each of LED light sources $11r$, $11g$ and $11b$ is current-controlled based upon data of quantity of light required so that a desired quantity of light is achieved.

The following description will discuss a structure in which as shown in FIG. 5, the quantity of light of each of the LED light sources $11r$, $11g$ and $11b$ is controlled in three stages of H, M and L. When the LED light sources $11r$, $11g$ and $11b$ have been turned off, the heater is maintained in the ON state so as to maintain the ambient temperature in a predetermined range. When the LED light sources $11r$, $11g$ and $11b$ are turned on so as to set the quantity of light of each of the LED light sources $11r$, $11g$ and $11b$ in the H-stage, the heating value of the heater is reduced to the L-stage in cooperation with these operations. Moreover, when the LED light sources $11r$, $11g$ and $11b$ are controlled so as to set the quantity of light thereof in the M-stage, the applied voltage is controlled so as to set the heating value of the heater in the M-stage in cooperation with these operations. Furthermore, when the LED light sources $11r$, $11g$ and $11b$ are controlled so as to set the quantity of light thereof in the L-stage, the applied voltage is controlled so as to set the heating value of the heater in the H-stage. Thus, each of the LED light sources $11r$, $11g$ and $11b$ is controlled so as to have a predetermined quantity of light in accordance with the kind of a photographic film to be read, and, for example, in the case of a negative-working film, it is controlled to the L-stage which is a low level of quantity of light, while in the case of a positive-working film, it is controlled to the M-stage of quantity of light. Here, FIG. 5 schematically shows the heating value control of the heater, and modes of embodiments are not intended to be limited by this. For example, not limited to the mode in which the quantity of light is varied step by step from H→M→L, the LED light sources may be kept on with the H-stage being maintained until turning off, or the LED light sources may be kept on with the M- or L-stage being maintained until turning off. Moreover, in the case when the ambient temperature exceeds a predetermined temperature, for example, due to effects of the external environment or other reasons, controlling operations may be conducted so that the heating value of the heater is set from the H-stage to the M- or L-stage or to the OFF state of the heater; or the heating value of the heater is set from the M-stage to the L-stage or to the OFF state of the heater; or the heating value of the heater is set from the L-stage to the OFF state of the heater.

In other words, the quantity of heat generation of the LED light source changes due to variations in the quantity of light to cause a change in the ambient temperature. In this case, the applied voltage to the heater is controlled so as to reduce the heating value of the heater in accordance with the quantity of light (quantity of heat generation). With this arrangement, it becomes possible to prevent variations in the ambient temperature caused by the heating value of the LED light source itself, and consequently to appropriately maintain the ambient temperature within a predetermined range.

Moreover, regardless of controls on the heater, operation controls are conducted on the cooling fan. With this arrangement, it becomes possible to always maintain the ambient temperature around the LED light source appropriately.

ANOTHER EMBODIMENT (1) The temperature adjusting device in accordance with the present invention is applicable not only to the case in which an LED light source is used for a scanner device, but also to the case in which it is used for an exposing light source which exposes and prints an image onto a photosensitive material.

(2) The structure of a light path that directs light from the LED light source to a photographic film is not limited by the present embodiment, and various modified embodiments may be proposed. For example, the light path structure may be formed by using not an optical fiber, but a dichroic mirror and a prism.

(3) In the present embodiment, when the applied voltage is gradually raised or lowered, the voltage is linearly increased or reduced; however, the present invention is not intended to be limited by this method. For example, the voltage may be increased or reduced in a curved manner. Moreover, the voltage may be increased or reduced by changing the voltage step by step. The voltage may be changed in a combined manner between a straight line and a curved line. In short, the voltage may be gradually changed within a range in which the functions and effects of the present invention are properly exerted.

(4) The present embodiment has exemplified a case in which three LEDs are used; however, in the case when a white-color LED is used, the structure may include a single LED.

What is claimed is:

1. A temperature adjusting device for an LED light source comprising:
   an LED light source;
   a temperature sensor for detecting an ambient temperature of the LED light source;
   a cooling fan for cooling the LED light source;
   a driving circuit for driving the cooling fan;
   a control unit that controls a voltage to be applied to the cooling fan so as to set the ambient temperature within a predetermined range based upon the results of detection by the temperature sensor; and
   a heater placed near the LED light source, characterized in that the control unit is designed to control the applied voltage to the heater so as to reduce the heating value of the heater in cooperation with lighting of the LED light source.

2. The temperature adjusting device for an LED light source according to claim 1, characterized in that when the ambient temperature is higher than a predetermined temperature, the control unit turns off the applied voltage to the heater.

3. The temperature adjusting device for an LED light source according to claim 1, characterized in that the control unit controls the applied voltage to the heater so as to reduce the heating value of the heater step by step.

4. The temperature adjusting device for an LED light source according to claim 1, characterized in that the control unit (4) turns the applied voltage to the cooling fan (20) on when the ambient temperature exceeds an upper-side switching temperature (T2) that is set at a temperature lower than the upper limit of a temperature permissible range, and also turns the applied voltage to the cooling fan off when the ambient temperature is lower than a lower-side switching temperature (T1) that is set at a temperature higher than the lower limit of the temperature permissible range.

5. The temperature adjusting device for an LED light source according to claim 1, characterized in that the LED light source (11) is used for a scanner-use light source for reading frame images of a photographic film.

6. The temperature adjusting device for an LED light source according to claim 1, characterized in that the LED light source (11) is used for an exposure-use light source for exposing and printing an image onto a photosensitive material.

7. The temperature adjusting device for an LED light source according to claim 1, characterized by comprising:

a red LED light source (11r), a green LED light source (11g), a blue LED light source (11b) that constitute a LED light source (11);

a red LED guiding portion (13r), a green LED guiding portion (13g) and a blue LED guiding portion (13b) that guide light rays applied from the respective light sources (11r, 11g, 11b); and a joining portion (13a) that allows the respective guiding portions to join to one another.

8. The temperature adjusting device for an LED light source according to claim 1, characterized in that the LED light source (11) is a white-color LED.

* * * * *